May 16, 1967     N. E. ANDERSSON     3,319,896
METHOD OF AND APPARATUS FOR CONVEYING
MANURE FROM STABLE GUTTERS
Filed Aug. 12, 1963     3 Sheets-Sheet 1
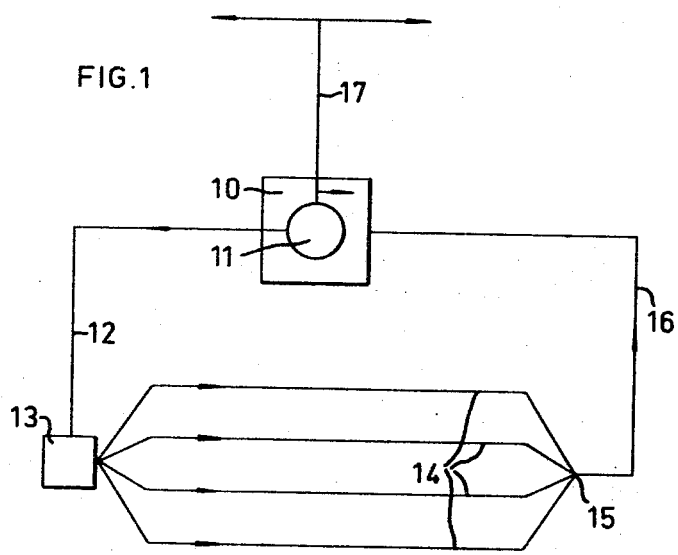
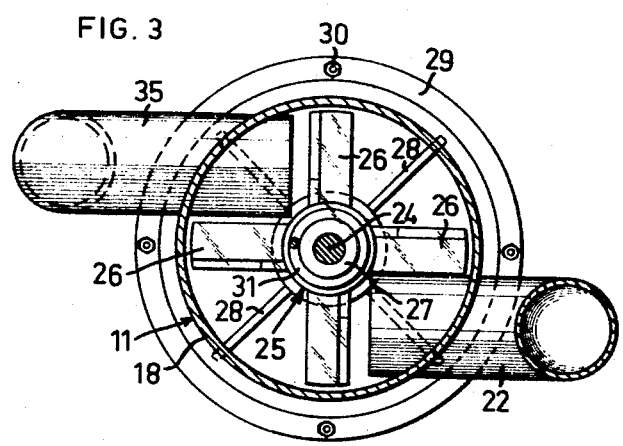

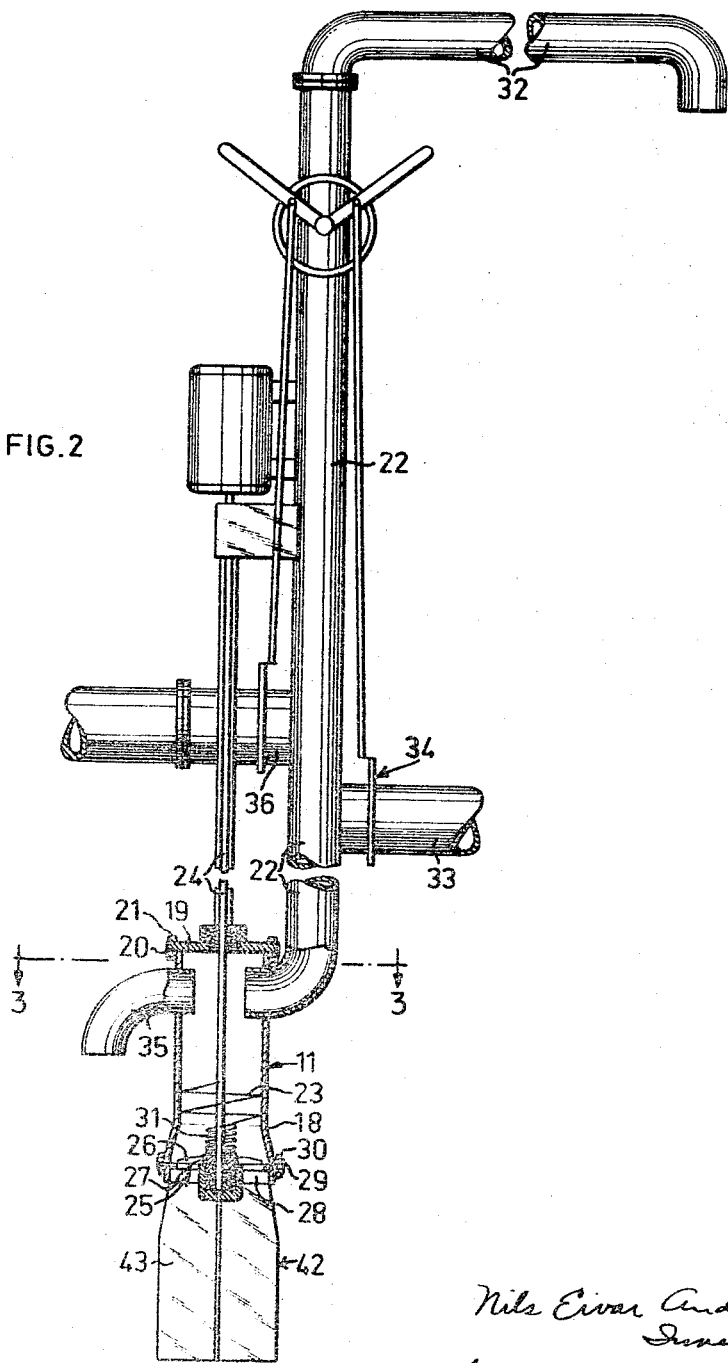

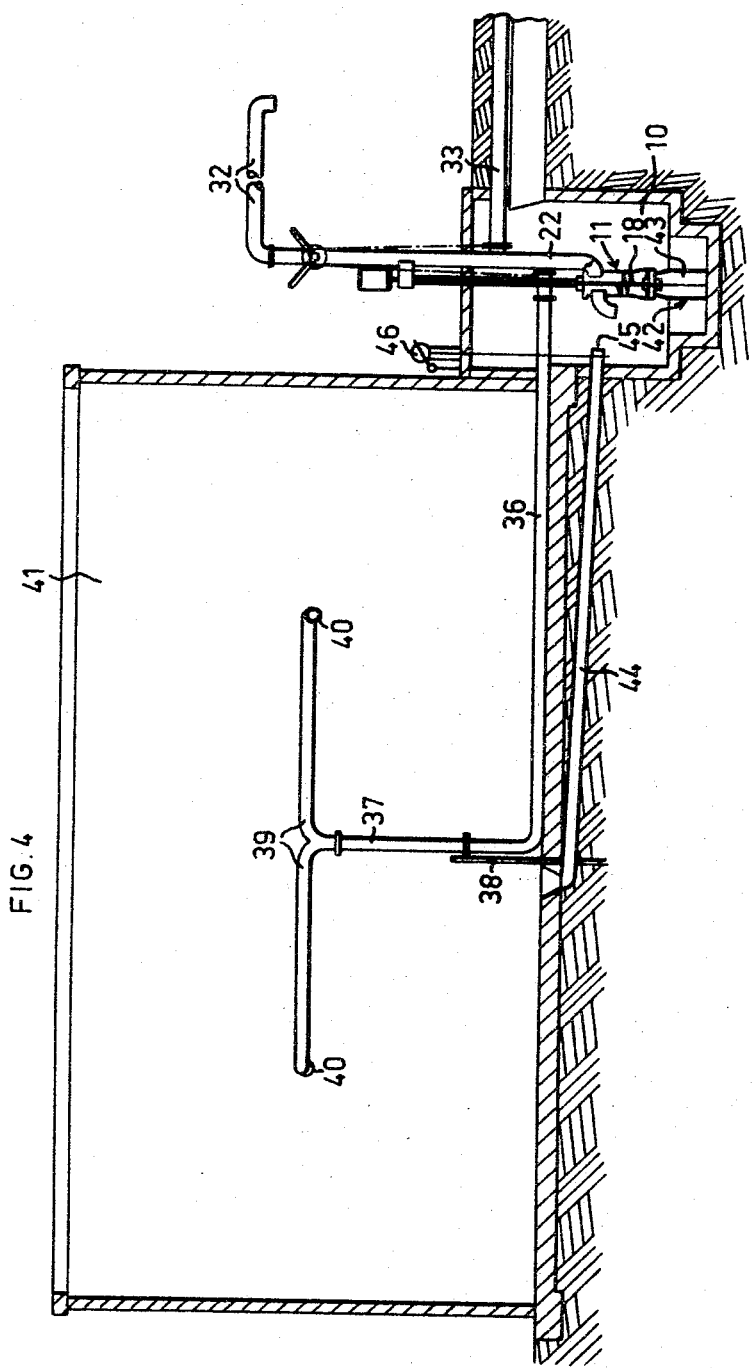

United States Patent Office 3,319,896
Patented May 16, 1967

3,319,896
METHOD OF AND APPARATUS FOR CONVEYING MANURE FROM STABLE GUTTERS
Nils Einar Andersson, Teatergatan 23, Klippan, Sweden
Filed Aug. 12, 1963, Ser. No. 301,377
Claims priority, application Sweden, Aug. 17, 1962, 8,967/62; Apr. 19, 1963, 4,315/63
8 Claims. (Cl. 241—25)

The methods of conveying manure from stables have not been modified appreciably during the last decades. They are thus relatively ancient and consequently uneconomical and physically strenuous. The present invention overcomes these disadvantages and relates to a method of conveying manure from a stable via a dung-mere to a storage or loading site. The method according to the invention comprises the steps of pumping the mixture of urine, water and solids, e.g. droppings and straw (litter), by means of a pump mechanism in the dung-mere through a conduit to a distribution point in the stable which communicates with the gutters thereof, causing the mixture to flow through the gutters, thereby carrying along their contents of urine, droppings, straw etc., returning the mixture to the dung-mere through a conduit, the straw material conveyed to the dung-mere being comminuted by the pump mechanism before it is pumped to the stable, the storage or loading site, and sending the desired quantity of the mixture in the dung-mere after completed circulation through the gutters to the storage or loading site by adjusting the outlet of the pump mechanism.

The invention is also concerned with an apparatus for carrying out the above described method. In said apparatus the outlet of the pump mechanism is connectible with the relatively deep, grid-covered gutters of the stable, which are in communication with the dung-mere, or with a storage or loading site, and that the pump mechanism is adapted to comminute straw material, such as litter.

The invention will now be described in more detail with reference to the accompanying drawings which illustrate an embodiment of the manure conveying apparatus. In the drawings:

FIG. 1 is a diagrammatic view of a manure conveying apparatus constructed in accordance with the invention;

FIG. 2 is a section of a pump mechanism;

FIG. 3 is a section on line 3—3 in FIG. 2, a screw exerting a pumping action being omitted;

FIG. 4 is a vertical elevation of the manure conveying apparatus with the collecting container.

According to FIG. 1 a manure conveying apparatus according to the invention comprises a dung-mere 10 in which a pump mechanism 11 is located. The outlet of the pump mechanism 11 is connectible with a conduit 12 leading to a distribution point 13 with which a number of gutters 14 communicate. The gutters 14 lead to a collecting point 15 connected with the dung-mere 10 via a conduit 16. The outlet of the pump mechanism 11 is also connectible with a conduit 17 for conveying the mixture in the dung-mere to a storage or loading site.

When the contents of the gutters of urine, droppings, straw material etc. is to be removed from the stable the pump mechanism is started whereby the relatively easily flowing mixture in the dung-mere is passed through conduit 12 to the distributing point 13 from where it enters the gutters 14. As a result the contents of the gutters is carried along and supplied to the dung-mere 10 via the collecting point 15. After finished conveyance of manure from the stable part of the contents of the dung-mere can be supplied, if desired or necessary, to the storage or loading site through conduit 17 by an adjustment of the outlet of the pump mechanism 11.

The collecting point designated as dung-mere is a dung-mere of the type ordinarily situated in the vicinity of the stable, but it is self-explanatory that a suitably designed and placed container can be utilized in lieu of said dung-mere. The collecting point 15 need not be in the shape of a well but should be capable of receiving the mixture from all gutters without any risk of flooding. The gutters 14 are relatively deep and covered by grids. The conventional gutters in stables as a rule need be made slightly deeper to be useful together with the pump mechanism according to the invention.

The pump mechanism 11 has a substantially vertically positioned, circular casing 18 disposed adjacent the bottom of the dung-mere. The upper end of the casing 18 is closed by means of a cover 19 which is fastened by bolts 21 to a flange 20 projecting from said casing. The lower end of the casing is open and forms the inlet opening. The outlet opening is arranged at the upper end of the casing and is constituted by the end of a pipe 22 projecting into the interior of the casing 18 through the wall thereof and cut off at right angles. Disposed in the casing 18 is a screw 23 which is adapted to exert a pumping action and which is secured on a drive shaft 24 extending centrally through the casing and rotatably mounted in the cover 19 of said casing 18. At the lower end of the casing the screw 23 is connected with a drive motor situated outside the dung-mere. The screw is mounted in such a way in the casing that it has its upper end adjacent the outlet and its lower end slightly spaced from the lower end of the casing 18. Provided between the lower end of the screw 23 and the lower end of the casing 18 is a cutting device generally designated 25 and driven by said shaft.

The cutting device 25 comprises four knives 26 radially extending from the shaft and movable longitudinally of the shaft 24, in order not to be damaged by stones or the like entering the cutting device, by means of a sleeve 27 which is slidable on said shaft but is held against rotation by a wedge arrangement. The knives cut against abutments in the form of two rectangular rods 28 extending diametrically over the inlet opening and intersecting one another at right angles, said rods 18 being fastened to a flange 29 on the casing by means of bolt 30. At the point of intersection of the bars 28 there is provided a bearing for the shaft 24. A spring 31 is provided between the lower end of the screw and the knives to urge the latter against the abutments.

As it has been found that the manure mixture adjacent the inlet of the pump mechanism may easily be caused to rotate by the action of the screw of the pump mechanism, which makes a satisfactory comminution of the straw material more difficult, there is secured to the lower end of the casing of the pump mechanism 11 a vane system 42 comprising three blades 43 having one longitudinal edge aligned with the drive shaft 24 and being interconnected along said edge at mutual angular distances of 120°. The vane system may preferably be disposed at the bottom of the dung-mere 10, thus forming a support for the pump mechanism 11.

The vane system 42 will prevent rotation of the mixture in vicinity of the inlet of the pump mechanism, and supply the mixture to the pump mechanism in such a way that straw material of considerable length is efficiently comminuted.

The pipe 22, the end of which forms the outlet opening of the pump mechanism, is bent in an upward direction adjacent the casing and then extends in parallel with the shaft 24 to the desired height. To the upper end of the pipe may be attached a rotatably mounted pipe elbow 32 the horizontal portion of which may be of any desired length whatever. The pipe 22 may have any desired number of branches 33 for leading the pumped medium to different places, e.g. the stable, different loading points etc. The branch 33 has shut-off means 34 which is preferably operable from the top of the dung-mere. Naturally, the pipe 22 also has shut-off means beyond the branch most remote from the pump mechanism. The pump mechanism may also have a second outlet 35, provided with shut-off means, for circulating and comminuting the mixture in the dung-mere. This outlet may of course be arranged also as a branch of the pipe 22.

36 designates a conduit connected to the pipe 22 which is connected to the outlet of the pump mechanism 11. From the dung-mere 10 said conduit 36 passes through the side wall of a relatively deep cylindrical container 41 (which constitutes the storage facilities) to a central point of the container near the bottom thereof. Here the conduit 36 is bent to form a vertical section 37 which is attached to a support 38. An outlet pipe 39 communicating with the conduit 36, 37 and having obliquely downwardly directed outlets 40 is pivotally mounted with its centre portion to said vertical section 37.

When the manure mixture is pumped by the pump mechanism 11 through the conduit 36 and flows through both branches of the outlet pipe 39 exiting through the outlets 40 thereof, the pipe 39 will start to rotate so that the jets directed to the surface of the manure mixture in combination with the agitation of the mixture thus caused, efficiently counteract the formation of a surface crust on the mixture.

For discharging the manure mixture in the container 41 there is provided a conduit 44 extending from a point at the bottom of the container 41 to the dung-mere 10, said conduit 44 having shut-off means 45 which is connected with an operating mechanism 46. When manure mixture is to be supplied from container 41 e.g. to a manure spreader the shut-off means 45 is opened and the mixture is allowed to flow into the dung-mere 10 from where it is pumped by the pump mechanism to the manure spreader.

For a satisfactory function of the apparatus according to the invention it is important that the cutting device of the pump mechanism thoroughly comminutes all straw material coming from the stable. As a consequence, and owing to the character of the mixture in the dung-mere, the conventional types of manure-water pumps available on the market cannot be used for this purpose.

At the installation of the apparatus according to the invention use can be made to a great extent of already existing devices, such as the dung-mere 10 and, possibly after being made deeper, the gutters 14 with the outlet 16, and therefore the costs of installation will be relatively low.

It will be obvious to those skilled in the art that various changes may be made without departing from the scope of the invention, and therefore the invention is not limited to what is shown in the drawings and described in the specification, but only as indicated in the appended claims.

What I claim and desire to secure by Letters Patent is:

1. A method of handling manure by flushing, comprising the steps of comminuting a mixture of urine, water, droppings, and straw materials into a pumpable state, pumping said mixture from a collecting container with an outlet near the upper end and an inlet at a lower level to a distributing point from where it is allowed to flow by gravity through upwardly open manure gutters in a stable, said gutters receiving the droppings directly from the animals, the flowing mixture adapted to carry solid and liquid constituents from said gutters back to said container.

2. A method of handling manure by flushing, comprising the steps of comminuting a mixture of urine, water, droppings, and straw materials into a pumpable state, pumping said mixture from a collecting container with an outlet near the upper end and an inlet at a lower level to a distributing point from where it is allowed to flow by gravity through upwardly open manure gutters, said gutters receiving the droppings directly from the animals, the flowing mixture adapted to carry solid and liquid constituents from said gutters back to said container, and thereafter pumping said mixture from said collecting container to a storage site via a nozzle which is situated at a central point of the site and rotatable by said mixture, and conveying said mixture through an outlet in the bottom of the storage site by gravity to said container and via the pump means to a loading site.

3. An apparatus for handling manure, comprising manure gutters in a stable, a collecting container having an outlet near its upper end and an inlet at a lower level, screw pump means in said container, said screw pump means being arranged to comminute elongated material and having an inlet spaced from the bottom of the container and an outlet connected to the container outlet, a first channel connecting said container outlet to one end of said manure gutters at a distribution point and a second channel connecting the other end of said manure gutters to said container inlet, said gutters and second channel being downwardly inclined from said distribution point to said container inlet to allow a mixture of urine, water, droppings, straw material etc. brought to the distribution point by said pump means to flow by gravity through said gutters back to said container, a conduit from the pump outlet to a loading site and closure means in said channels and conduit.

4. An apparatus for handling manure, comprising manure gutters in a stable, a collecting container having an outlet near its upper end and an inlet at a lower level, screw pump means in said container, said screw pump means being arranged to comminute elongated material and having an inlet spaced from the bottom of said container and an outlet connected to said container outlet, a first channel connecting said container outlet to one end of said manure gutters at a distribution point and a second channel connecting the other end of said manure gutters to said container inlet, said gutters and second channel being downwardly inclined from said distribution point to said container inlet to allow a mixture of urine, water, droppings, straw material, etc., brought to the distribution point by said pump means to flow by gravity through said gutters back to said container, a storage site with a central inlet nozzle and an outlet in the bottom thereof, said inlet nozzle being connected to the pump outlet and rotatable by the pumped mixture and a conduit from said site outlet to said container, a conduit from the pump outlet to a loading site and closure means in said channels and conduits.

5. An apparatus for handling manure, comprising manure gutters in a stable, a collecting container having an outlet near its upper end and an inlet at a lower level, pump means in said container spaced from the bottom thereof, said pump means including a casing with inlet and outlet, abutment rods in said inlet, a shaft extending through the casing, a screw and cutting knives non-rotatably secured on said shaft in the casing with the knives cutting against the upper side of said abutment rods in the inlet, the outlet being connected to said container outlet, a first channel connecting said container outlet to one end of said manure gutters at a distribution point and a second channel connecting the other end of said manure gutters to said container inlet, said gutters and second channel being downwardly inclined from said distribution point to said container inlet to allow a mixture of urine, water, droppings, straw material, etc., brought to the distribution point by said pump means to flow by gravity through said gutters back to said container, a conduit from said pump outlet to a loading site and closure means in said channels and conduit.

6. An apparatus according to claim 5, wherein said casing is in the form of a cylinder, one end of which is open forming the inlet, said abutment rods constituting a bearing for said shaft.

7. An apparatus for handling manure, comprising manure gutters in a stable, a collecting container having an outlet near its upper end and an inlet at a lower level, pump means in said container, said pump means being arranged to comminute elongated material and having an inlet spaced from the bottom of the container and an outlet connected to the container outlet, a first channel connectnig said container outlet to one end of said manure gutters at a distribution point and a second channel connecting the other end of said manure gutters to said container inlet, said gutters and second channel being downwardly inclined from said distribution point to said container inlet to allow a mixture of urine, water, droppings, straw material, etc., brought to the distribution point by said pump means to flow by gravity through said gutters back to said container, a storage site with an inlet nozzle and an outlet in the bottom thereof, said inlet nozzle being connected to said pump outlet and rotatable by the pumped mixture and including a substantially vertical pipe portion placed centrally in the storage site and a horizontal discharge pipe of considerable length rotatably mounted on said vertical portion and having at least one obliquely downwardly directed outlet for spreading the pumped mixture over the entire storage site, a conduit from said storage site outlet to said collecting container, a conduit from said pump outlet to a loading site and closure means in said channels and conduits.

8. An apparatus for handling manure, comprising a collecting container having an outlet near its upper end and an inlet at a lower level, pump means in said container spaced from the bottom thereof, said pump means including a cylindrical casing with one open end forming the inlet and an outlet in the cylindrical wall thereof, a shaft extending through said casing, a screw and cutting knives non-rotatably secured on said shaft, rods extending across said open end, said rods forming abutment means for said cutting knives and constituting a bearing for said shaft, said knives lying inwardly of the abutment means in said casing, plate means preventing rotation of the mixture to be pumped close to the inlet and supporting said casing, motor means for rotating said shaft, said outlet of the pump casing being connected to said container outlet, a storage site with an inlet nozzle and an outlet in the bottom thereof, said inlet nozzle being connected to the pump outlet and rotatable by the pumped mixture and including a substantially vertical pipe portion placed centrally in the storage site and a horizontal discharge pipe of considerable length rotatably mounted on said vertical portion and having two obliquely downwardly directed outlet openings for spreading the pumped mixture over the entire storage site, a conduit from said storage site outlet to said collecting container, a conduit from the pump outlet to a loading site and closure means in said conduits.

References Cited by the Examiner

UNITED STATES PATENTS

| 2,868,589 | 1/1959 | Schmidt et al. | 302—14 |
| 3,076,489 | 2/1963 | Schmidt et al. | 146—182 |

FOREIGN PATENTS

| 1,084,653 | 6/1960 | Germany. |
| 584,395 | 1/1947 | Great Britain. |

WILLIAM W. DYER, Jr., *Primary Examiner.*

W. G. ABERCROMBIE, *Assistant Examiner.*